United States Patent
Mizes et al.

(10) Patent No.: US 7,729,015 B2
(45) Date of Patent: Jun. 1, 2010

(54) METHODS AND APPARATUSES FOR CONTROLLING PRINT DENSITY

(75) Inventors: Howard A. Mizes, Pittsford, NY (US); Robert P. Loce, Webster, NY (US); Lalit K. Mestha, Fairport, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1197 days.

(21) Appl. No.: 11/313,018

(22) Filed: Dec. 20, 2005

(65) Prior Publication Data

US 2007/0139733 A1 Jun. 21, 2007

(51) Int. Cl.
G06K 15/00 (2006.01)
H04N 1/405 (2006.01)
H04N 1/46 (2006.01)

(52) U.S. Cl. ....................... 358/3.1; 358/504

(58) Field of Classification Search .......... 358/3.1, 358/1.1, 1.2, 1.9, 504, 406, 515–522, 3.02, 358/3.03, 3.04, 3.06

See application file for complete search history.

(56) References Cited

U.S. PATENT DOCUMENTS

| | | | |
|---|---|---|---|
| 4,553,033 A | 11/1985 | Hubble | |
| 5,471,313 A | 11/1995 | Butler et al. | |
| 5,749,020 A | 5/1998 | Mestha | |
| 5,963,244 A | 10/1999 | Mestha | |
| 6,021,285 A | 2/2000 | Mestha | |
| 6,636,628 B1 | 10/2003 | Wang | |
| 6,744,531 B1 | 6/2004 | Mestha et al. | |
| 6,760,056 B2 | 7/2004 | Klassen et al. | |
| 6,934,053 B1 | 8/2005 | Mestha et al. | |
| 7,148,995 B2 * | 12/2006 | Martinez et al. | 358/1.9 |
| 7,201,462 B2 * | 4/2007 | Shibata et al. | 347/19 |
| 2002/0075379 A1 | 6/2002 | Klassen | |
| 2003/0217662 A1 | 11/2003 | Koifman et al. | |
| 2005/0006485 A1 | 1/2005 | Koifman | |
| 2005/0006486 A1 | 1/2005 | Koifman et al. | |
| 2005/0007609 A1 | 1/2005 | Itagaki et al. | |
| 2005/0036705 A1 | 2/2005 | Viassolo et al. | |
| 2005/0099446 A1 | 5/2005 | Mizes | |

FOREIGN PATENT DOCUMENTS

JP 2004007274 A 1/2004

OTHER PUBLICATIONS

U.S. Appl. No. 11/120,783, filed May 3, 2005, Donaldson.

(Continued)

*Primary Examiner*—Douglas Q Tran
(74) *Attorney, Agent, or Firm*—Fay Sharpe LLP (57) ABSTRACT

Multiple input patches are received on an output media, which patches are characterized by print density representing a document processing system's response to different input grayscale values over a potential response space. Values associated with the print density of each input grayscale value are measured. Reference Engine Response Curves are determined from the measured print density values and input gray scale values. A variance data representative of a difference between each measured print density value and a respective reference Engine Response Curve is determined. The variance data is transformed into individual components. Based at least on one selected individual component, a set of calibration compensating Tone Reproduction Curves is determined. The determined calibration compensating Tone Reproduction Curves are applied to input grayscale values.

20 Claims, 4 Drawing Sheets

OTHER PUBLICATIONS

U.S. Appl. No. 10/922,316, filed Aug. 19, 2004, Zhang.
"Gray Balance Control Loop for Digital Color Printing Systems," Proceedings of 21st International Conference on Digital Printing Technologies, NIP21, pp. 499-505 (2005), Lalit K. Mestha, R. Enrique Viturro, Yao Rong Wang, and Sohail A. Dianat, Xerox Corporation, Wilson Center for Research Technology.

U.S. Appl. No. 10/342,873, dated Nov. 22, 2002, Van de Capelle et al.

* cited by examiner

METHODS AND APPARATUSES FOR CONTROLLING PRINT DENSITY

BACKGROUND

The following relates to printing systems. It finds particular application in conjunction with adjusting print uniformity for printing multiple halftones and will be described with the particular reference thereto. However, it is to be appreciated that the following is also amenable to other like applications.

Typically, within the printing system, a digital image gray level value is passed as an input to an image processing module containing functions such as the Tone Reproduction Curve (TRC) for each of the separations. The Tone Reproduction Curve modifies the input gray level value in accordance with the rules determined typically during calibration such as during gray balance as described in Mestha, "Gray Balance Control Loop for Digital Color Printing Systems," identified below, and provides the modified gray level value to a marking engine. The Engine Response Curve (ERC) of the marking engine describes the printed density as a function of the modified gray level input provided to the marking engine by the Tone Reproduction Curve. An ERC can be constructed and updated at regular intervals during print runs while executing process control functions. One method for updating an ERC employs optical sensors to measure print density on a belt as disclosed in U.S. Pat. No. 5,471,313, identified below. Accordingly, the marking engine writes toner or ink on a print media at a density determined by the modified gray level. The System Response Curve (SRC), as used in the present application, is the relationship between the input gray level and the output print density.

To produce high quality prints, the printer is required to maintain a consistent System Response Curve over time and space. An ideal, robust marking engine would have an ERC or SRC that is stable over space and time. However, the performance of sub systems in the marking engine due to disturbances, such as various halftones, media type, and environmental zones, may vary. ERC variation over space may result in streaks, which are generally defined as variations in the print density image quality in the cross process direction. In addition, ERC variation over time may lead to page-to-page color shifts.

One approach to maintain a consistent System Response Curve is to use feedback control, in which the stability or uniformity over time is achieved by monitoring patches at selected grayscale levels. The Engine Response Curve is inferred over all halftone gray levels based on the monitored patches. The compensating Tone Reproduction Curve is derived and applied based on the inferred Engine Response Curve such that the overall System Response Curve is maintained. Likewise, stability or uniformity over space is achieved by monitoring the uniformity of strips at selected grayscale levels. The spatially dependent Engine Response Curve is inferred over all halftone gray levels based on the monitored patches. Spatially varying compensating TRC is applied based on the spatially varying ERC. However, typically, the marking engine prints more than one halftone. For example, the print job might require printing multiple halftones such as printing a coarse halftone for graphics and a fine halftone for photography. The magnitude of streaks is typically different for different halftones. Each halftone may have a different ERC. If only one halftone is monitored and the compensating TRCs are derived for only the monitored halftone, the compensation may not be adequate for other halftones.

In another approach, each halftone screen is printed and compensating ERC or TRC for each halftone is determined. However, since a typical printer prints a plurality of halftones, such approach is costly and time consuming in most applications.

There is a need for methods and apparatuses which overcome the aforementioned problems and others.

CROSS REFERENCE TO RELATED PATENTS AND APPLICATIONS

The following application, the disclosure of which is being totally incorporated herein by reference is mentioned:

Patent application Ser. No. 11/120,783, filed May 3, 2005, entitled "Tone Reproduction Curve Systems and Methods", by P. Donaldson;

Patent application Ser. No. 10/922,316, filed Aug. 19, 2004, entitled "Methods and Systems for Print Uniformity Using Reduced Memory or Computational Requirements", by Zhang.

INCORPORATION BY REFERENCE

The following publications, the disclosure of which are being totally incorporated herein by reference are mentioned:

"Gray Balance Control Loop for Digital Color Printing Systems," Proceedings of $21^{st}$ International Conference on Digital Printing Technologies, NIP21, pp. 499-505 (2005).

REFERENCES

U.S. Pat. No. 5,471,313 to Butler, issued Nov. 28, 1995, entitled "Method and Control System Architecture for Controlling Tone Reproduction in a Printing Device", describes a method for updating ERC by employing optical sensors to measure print density on a belt.

U.S. Pat. No. 6,636,628 to Wang, issued Oct. 21, 2003, entitled "Iteratively clustered interpolation for geometrical interpolation of an irregularly spaced multidimensional color space," describes an iteratively clustered interpolation (ICI) algorithm for use with irregularly sampled color data to develop a structured inverse.

U.S. Pat. No. 6,021,285 to Mestha, issued Feb. 1, 2000, entitled "Sensorless quality control apparatus used upon malfunction of a quality control sensor and method therefore," describes an image quality control apparatus controls quality of xerographic images formed by a xerographic imaging system onto a recording medium when at least one sensor which is operative to provide signals to the xerographic imaging system for quality control malfunctions.

U.S. Pat. No. 5,963,244 to Mestha, issued Oct. 5, 1999, entitled "Optimal reconstruction of tone reproduction curve," describes a method of machine control including the recreation of a tone reproduction curve by providing a look up table.

U.S. Pat. No. 5,749,020 to Mestha, issued May 5, 1998, entitled "Coordinitization of tone reproduction curve in terms of basis functions," describes fundamental machine functions such as the Tone Reproduction Curve that are divided into regions of smaller units so that each unit can be interrelated to some aspects of the internal machine process.

U.S. Pat. No. 4,553,033 to Hubble, issued Nov. 12, 1985, entitled "Infrared reflectance densitometer," describes an integral, compact infrared reflectance densitometer including a substrate supporting an LED, a control photodiode to compensate for component degradation, a background photodiode to compensate for background radiation, and a large area photodiode to provide an electrical signal representative of the amount of toner particles on the photosensitive surface.

U.S. Patent Application Publication No. 2002/0075379, published Jun. 20, 2002, by Klassen, entitled "Macro uniformity correction for x-y separable non-uniformity," describes a method for rendering a raster output level which determines an image position of a pixel of interest (POI) within an image. A final raster output level is determined as a function of the image position and the intended raster output level.

U.S. Pat. No. 6,744,531 to Mestha, issued Jun. 1, 2004, entitled "Color adjustment apparatus and method", describes an apparatus and method to achieve consistent output across plurality of different hardcopy devices.

U.S. Pat. No. 6,934,053 to Mestha, issued Aug. 23, 2005, entitled "Methods for producing device and illumination independent color reproduction", describes a method for obtaining spectrally matched color outputs using data from a real-time sensor, such as, for example, a spectrophotometer on the output trays of a marking device.

Patent application Ser. No. 10/342,873, filed on Nov. 22, 2002 by Capelle, "Iterative printer control and color balancing system and method using a high quantization resolution halftone array to achieve improved image quality with reduced processing overhead", describes a system and method to perform printer calibration spatially on the halftones while they are in a high quantization resolution form.

U.S. Pat. No. 6,760,056, to Klassen, issued Jul. 6, 2004, entitled "Macro Uniformity Correction for X-Y Separable Non-Uniformity", describes a method for rendering a raster output level within an image pixel of interest to substantially match the intended raster output level.

US Patent Application Publication No. 20050099446, filed on May 12, 2005, by Mizes, entitled "Systems and methods for compensating for streaks in images", describes the use of fiducial marks to correlate the pixel columns in the engine response curve with the pixel columns in the toner response curve.

US Patent Application Publication No. 20050036705, filed on Feb. 17, 2005, by Viassolo, entitled "Active compensation of streaks using spatial filtering and feedback control", describes how the streaks are compensated.

However, these references do not discuss achieving simultaneous uniformity of print density for multiple color separations across the imaging area using reduced tone measurements for different halftone screens.

BRIEF DESCRIPTION

In accordance with one aspect, a method is disclosed. Multiple input patches are received on an output media, which patches are characterized by print density representing a document processing system's response to different input grayscale values over a potential response space. Values associated with the print density of each input grayscale value are measured. Reference Engine Response Curves are determined from the measured print density values and input gray scale values. A variance data representative of a difference between each measured print density value and a respective reference Engine Response Curve is determined. The variance data is transformed into individual components, each component including a data content and a noise content. Based at least on one selected individual component, a set of calibration compensating Tone Reproduction Curves is determined. The determined calibration compensating Tone Reproduction Curves are applied to input grayscale values.

In accordance with another aspect, a document processing system is disclosed. A marking engine prints input patches on an output media corresponding to input digital grayscale values. A sensor measures print density of the input patches associated with respective input grayscale values. A mean ERC determining device determines reference Engine Response Curves from a series of measured print densities for a set of different input grayscale values. A compensating device determines a set of compensating Tone Reproduction Curves and applies the determined compensating Tone Reproduction Curves to the input grayscale values to maintain a space of desired uniformity over at least one of space and time, which compensating device includes: a density variation determining device for determining a variance data representative of difference between each measured Engine Response Curve and a respective reference Engine Response Curve, and a transformation device for transforming the variance data into individual components, based on which the compensating device determines a set of compensating Tone Reproduction Curves.

In accordance with another aspect, a method is disclosed. Input patches which represent multiple grayscale values of a document processing system over a space of desired uniformity are received. Print density for each patch for each respective grayscale value is measured. Reference Engine Response Curves are determined from a series of patch density measurements and input grayscale values. A variance data representative of difference between each measured Engine Response Curve and a respective reference Engine Response Curve is determined. The variance data is transformed into individual components. Components which are representative of the determined Engine Response Curves are selected. Weights for the selected components are determined. Based on the selected components and determined weights, a set of calibration compensating Tone Reproduction Curves is determined. The determined compensating Tone Reproduction Curves are applied to the input grayscale values.

DETAILED DESCRIPTION

Figure 1:
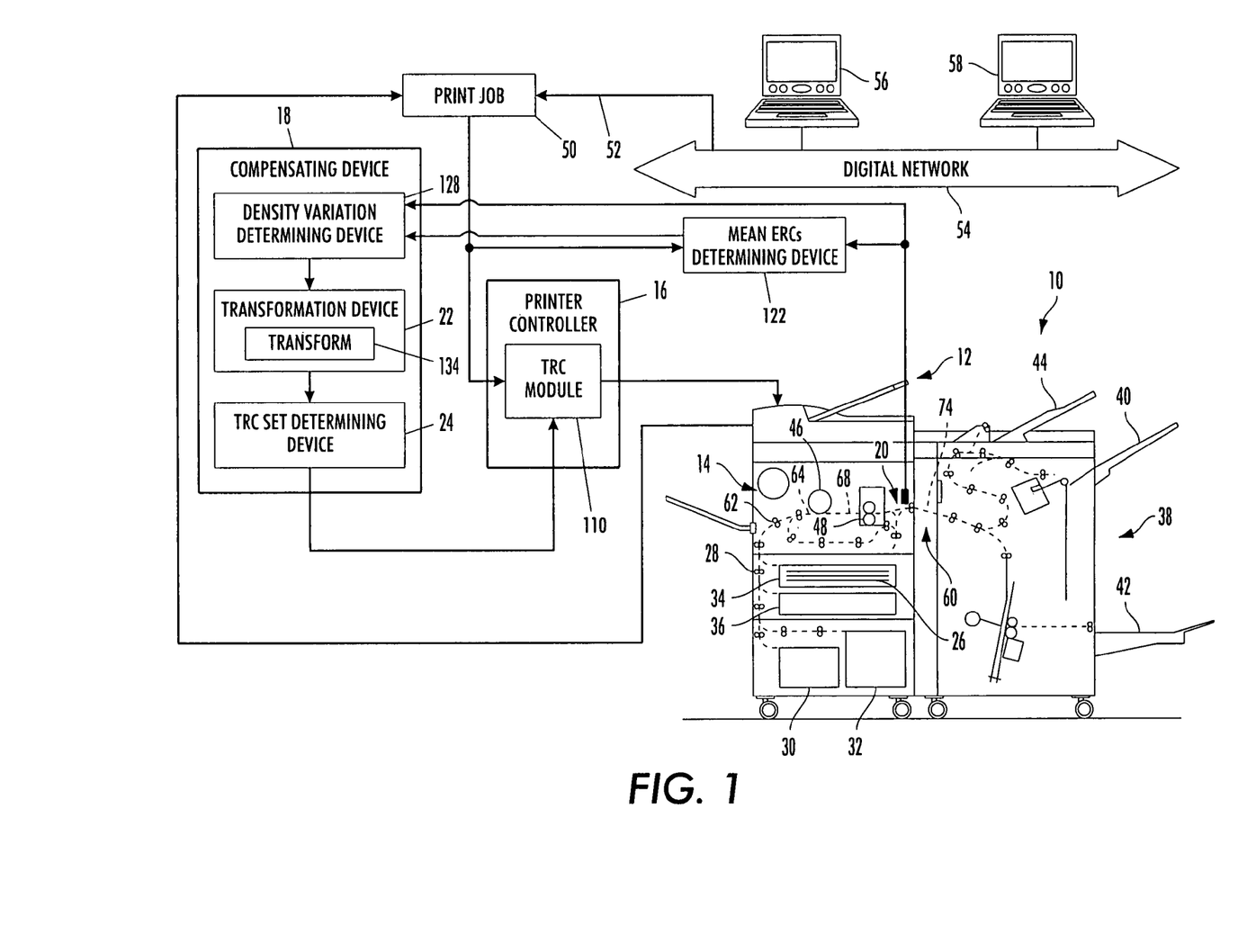
FIG. 1 is a diagrammatic illustration of a document processing system.

With reference to FIG. 1, a printing or document processing system 10 includes an image input device 12 such as a scanner, a printer such as a printing or marking engine or printer 14, and a system controller 16, all interconnected by links. The links can be wired or wireless links or other means capable of supplying electronic data to and/or from the connected elements. Exemplary links include telephone lines, computer cables, ISDN lines, and the like. The image input device 12 may include conversion electronics for converting the image-bearing documents to image signals or pixels or such function may be assumed by the marking engine 14.

As described in greater detail below, a compensating device or algorithm or processor 18 compensates for non uniformity in print density of the printing system over time and space by taking into consideration that the printer outputs a different density for different sub system or component disturbances. A sensor 20 measures print density values which vary in time and/or in space. A transformation processor or algorithm or device 22 performs a data analysis on the data. More specifically, the data is transformed into variables or components by using transforms. The transforms are selected, for example, to enable simpler analysis of multivariate data using the properties of derived variables such as data redunduncies (correlations), separability, orthogonality, and dimensionality reduction. Often, the original representation of the data contains redundancies due to correlations between many of the variables. By appropriately transforming the measured data into derived variables, a more compact representation of the data is achieved by neglecting some of the variables. A TRC set determining device or algorithm or processor 24 determines a set of compensating TRCs.

With continuing reference to FIG. 1, the marking engine 14 is fed with a print media or sheet or sheets 26 from a respective print media feeding source 28 such as a paper feeder including one or more print media sources or paper trays 30, 32, 34, 36. Each of the print media sources 30, 32, 34, 36 can store sheets of the same type of print media, or can store different types of print media. For example, the print media sources 30, 32 may store the same type of large-size paper sheets, print media source 34 may store company letterhead paper, and the print media source 36 may store letter-size paper. The print media can be substantially any type of media upon which the marking engine 14 can print, such as: high quality bond paper, lower quality "copy" paper, overhead transparency sheets, high gloss paper, and so forth. Printed media from the marking engine 14 is delivered to a finisher 38 including one or more finishing output destinations 40, 42, 44 such as trays, stackers, pans, etc. The marking engine 14 includes an imaging component 46 and an associated fuser 48.

In one embodiment, the printing system 10 is a xerographic printing system in which the marking engine 14 includes a photoconductive insulating member which is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with an imaging material such as a developing powder comprising toner particles. The toner image may subsequently be transferred to the print media, to which the toner image is permanently affixed in the fusing process. In a multicolor electrophotographic process, successive latent images corresponding to different colors are formed on the insulating member and developed with a respective toner of a complementary color. Each single color toner image is successively transferred to the paper sheet in superimposed registration with the prior toner image to create a multi-layered toner image on the paper. The superimposed images may be fused contemporaneously, in a single fusing process. It will be appreciated that other suitable processes for applying an image may be employed.

The fuser 48 receives the imaged print media from the image-forming component and fixes the toner image transferred to the surface of the print media substrate. The fuser 48 employed in the printer 14 can be of any suitable type, and may include fusers which apply heat or both heat and pressure to an image. For example, the fuser may apply one or more of heat or other forms of electromagnetic radiation, pressure, electrostatic charges, and sound waves, to form a copy or print. One suitable fuser includes a pair of rotating rollers spaced to define a nip through which the print media is fed. One of the rollers is heated, while the other roller may serve simply as a means of applying pressure. Other fusing members are also contemplated in place of a pair of rollers, such as belts, sleeves, drumbeats, and the like. Other suitable fusers which may be employed include radiant fusers, which apply a high-intensity flash lamp to the toner and paper.

The printing system 10 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. While the illustrated embodiment shows one marking engine 14, it will be appreciated that the printing system 10 may include more than one marking engine, such as two, three, four, six, or eight marking engines. The marking engines may be electrophotographic printers, ink-jet printers, including solid ink printers, and other devices capable of marking an image on a substrate. The marking engines can be of the same print modality (e.g., process color (P), custom color (C), black (K), or magnetic ink character recognition (MICR)) or of different print modalities.

An original document or image or print job or jobs 50 can be supplied to the printing system 10 in various ways. The built-in optical scanner 12 can be used to scan a document such as book pages, a stack of printed pages, or so forth, to create a digital image of the scanned document that is reproduced by printing operations performed by the printing system 10. Alternatively, the print jobs 50 can be electronically delivered to the system controller 16 of the printing system 10 via a wired connection 52 from a digital network 54 that interconnects example computers 56, 58 or other digital devices. For example, a network user operating word processing software running on the computer 58 may select to print the word processing document on the printing system 10, thus generating the print job 50, or an external scanner (not shown) connected to the network 54 may provide the print job 50 in electronic form. While the wired network connection 52 is illustrated, a wireless network connection or other wireless communication pathway may be used instead or additionally to connect the printing system 10 with the digital network 54. The digital network 54 can be a local area network such as a wired Ethernet, a wireless local area network (WLAN), the Internet, some combination thereof, or so forth. Moreover, it is contemplated to deliver the print jobs 50 to the printing system 10 in other ways, such as by using an optical disk reader (not illustrated) built into the printing system 10, or using a dedicated computer connected only to the printing system 10.

A print media transporting system or network or highway 60 links the print media source 28, printer 14 and finisher 38. The print media transporting system 60 includes a network of flexible paper pathways that feeds to and collects from each of the printers. The print media transporting system 60 may comprise drive members, such as pairs of rollers 62, spherical nips, air jets, or the like. The system 60 may further include associated motors for the drive members, belts, guide rods, frames, etc. (not shown), which, in combination with the drive members, serve to convey the print media along selected pathways at selected speeds. In the illustrated embodiment, the print media from the source 28 is delivered to the printer 14 by a pathway 64 which is common to the trays 30, 32, 34, 36. The print media is printed by the imaging component 46 and fused by the fuser 48. A pathway 68 from the printer 14 merges into a pathway 74 which conveys the printed media to the finisher 38.

The pathways 64, 68, 74 of the network 60 may include inverters, reverters, interposers, bypass pathways, and the like as known in the art. It will be appreciated that the printer 14 may be configured for duplex or simplex printing and that a single sheet of paper may be marked by two or more of the printers or marked a plurality of times by the same printer, for example, by providing internal duplex pathways.

Figure 2:
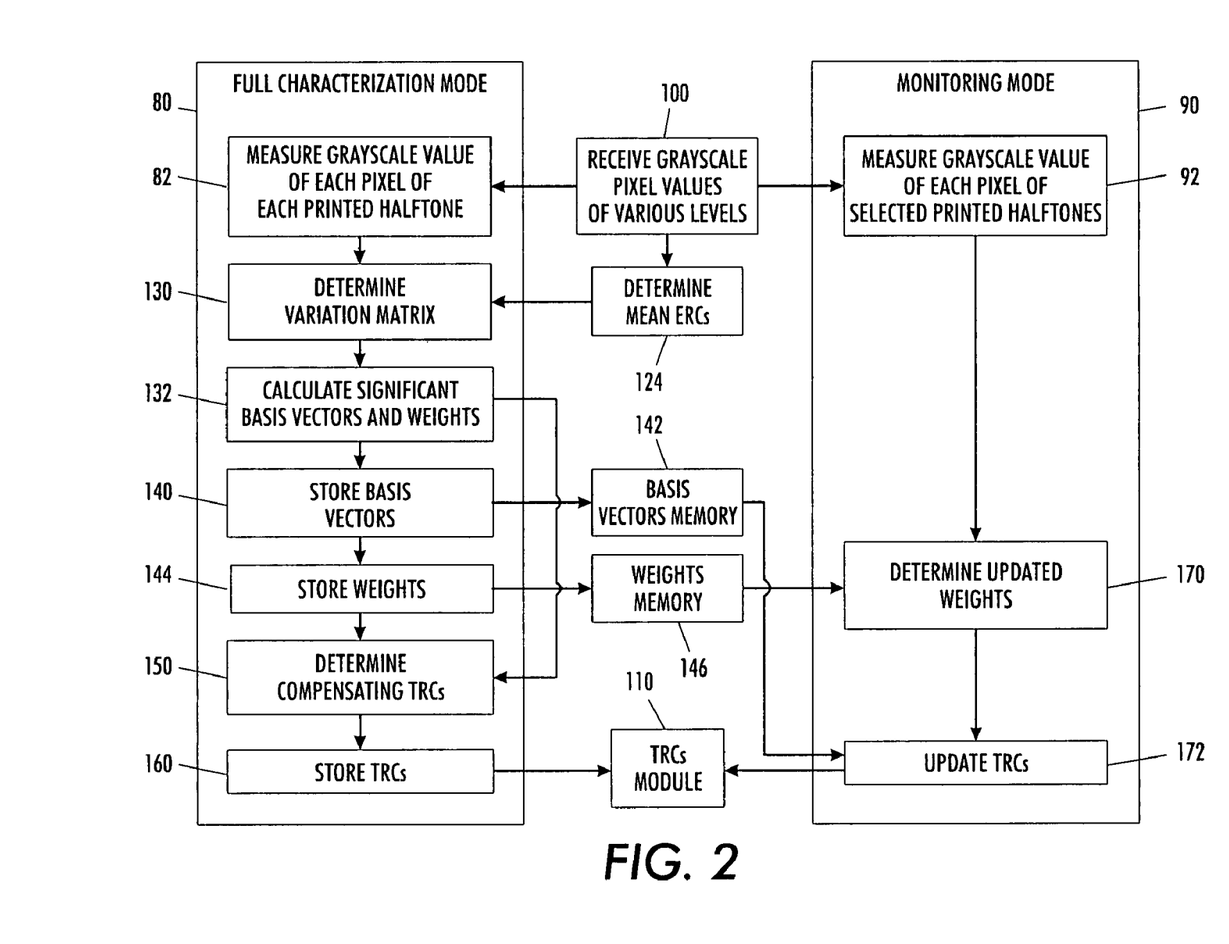
FIG. 2 is a block diagram of a method for controlling non uniformity in a document processing system.

With reference to FIG. 2, stability of the System Response Curve (SRC) is achieved using two steps. A full characterization mode or step 80 includes measuring 82 individual ERCs or grayscale values of each pixel of multiple gray levels and halftone screens or strips or patches to detect and measure non uniformity over space and/or time as discussed in detail below. A monitoring mode or step 90 includes measuring 92 individual ERCs or grayscale values of each pixel of selected gray levels and halftone patches. E.g., in the monitoring mode 90 only some gray levels and halftone strips are measured. For example, a number of selected strips measured in the monitoring mode 90 is substantially smaller than the number of strips measured in the full characterization mode 80. Of course, it is contemplated that the number of strips measured in the monitoring mode 90 is any number of strips, including the number of strips which provides the full characterization of the printing system. The uniformity or change in the ERC is calculated or inferred for all gray levels and halftone screens based on the measured gray levels to achieve desired space of uniformity.

The desired space of uniformity refers to spatial extent, as in x and y coordinates, time, multiple print engines, and multiple imagers. The spatial extent can be addressed directly as x and y position, or column and row implementations can be realized, for streaks and bands, respectively. The uniformity in time refers to the uniformity of a print engine as it operates during a print job, or over a period of time. The multiple print engine aspect includes any print engines that are coupled operationally. The multi-imager aspect comprehends multiple print heads that may be used to print an image.

In general, the full characterization mode 80 can include printing patches of various dot or line patterns that are not the same as one particular halftone. In one embodiment, the full characterization mode 80 is performed for all halftone screens that are typically printed by the marking engine during the operation of the printing system, e.g. over a potential response space such as a space quantized to 8, 10, or 12 bits. A correlation method can be used to determine which patterns best correlate to the ERCs for the collection of halftones. In the monitoring mode 90, the selected grayscale levels and halftone screens are printed and measured. The ERCs are inferred over all grayscale levels and halftone screens via knowledge of the correlation. The inferred ERCs are used to construct compensating TRCs within a feedback control system.

The transformation processor 22 transforms the measured data into variables or components. For example, the data is transformed by performing the Singular Value Decomposition (SVD) transform. As discussed below, the Singular Value Decomposition transform is applied to the data represented in a matrix to determine the basis vectors that give the significant variability in the ERC. The correlation of the halftones is determined from the elements within the basis vectors. From the basis vectors and a precise measurement of selected gray levels, the ERC across all halftone levels can be estimated and used to update the TRCs to maintain a uniform System Response Curve.

Figure 3:
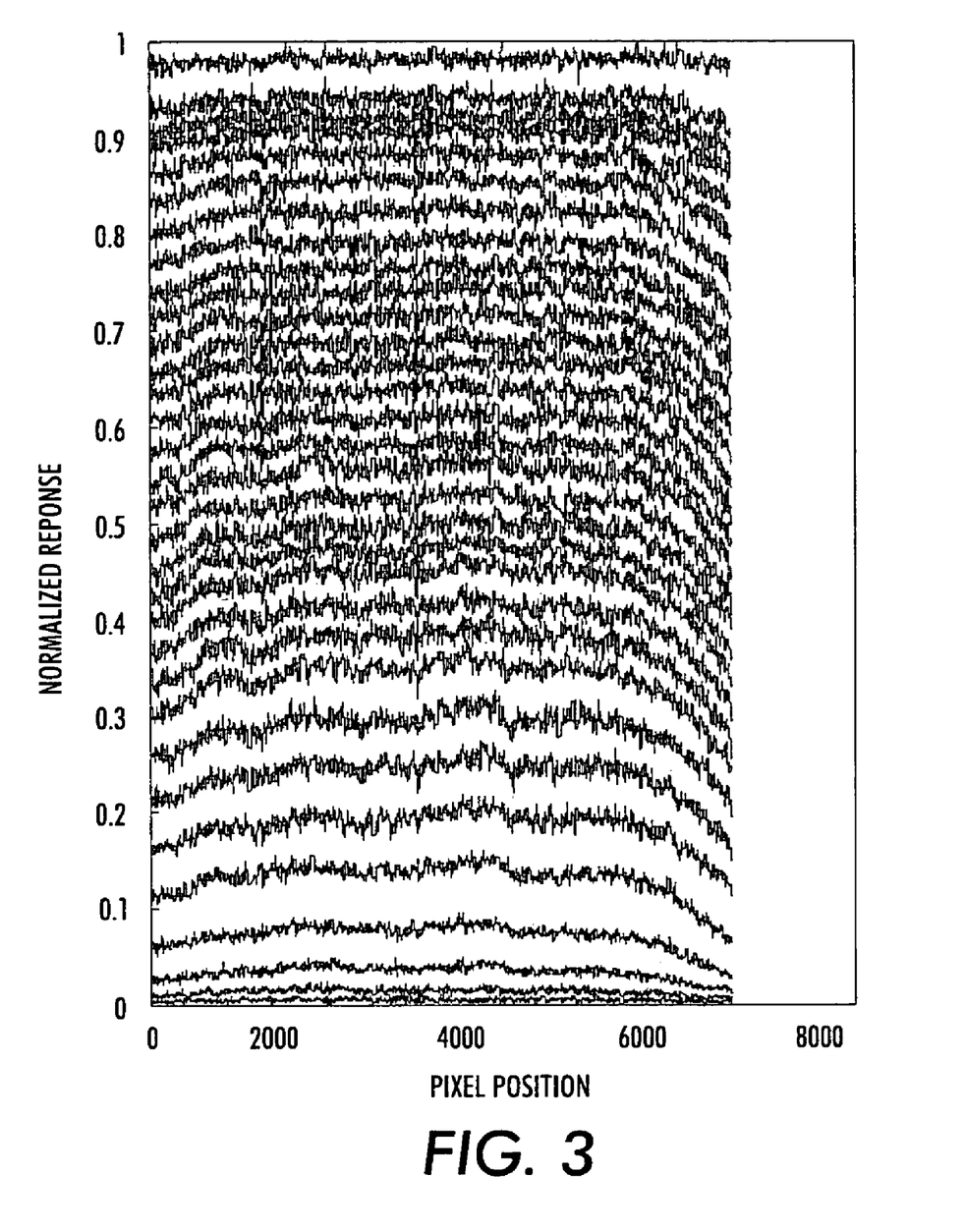
FIG. 3 is a graphical representation of grayscale value measurements of 32 patches.

With reference to FIG. 3, the measurement of 32 narrow strips is shown versus pixel position in the cross process direction. Generally, the precision of the measurement depends on the width of the strip in the process direction. With a wider strip, process and measurement noise are decreased, which allows for more accurate determination of the print density for each strip. The more narrow strips result in a greater amount of noise for any individual strip, as seen in FIG. 3. However, because a large number of strips is being processed simultaneously, the print density of an individual strip does not need to be determined with great precision. The streaks occur at the same location for all halftones but with different magnitudes.

Figure 4:
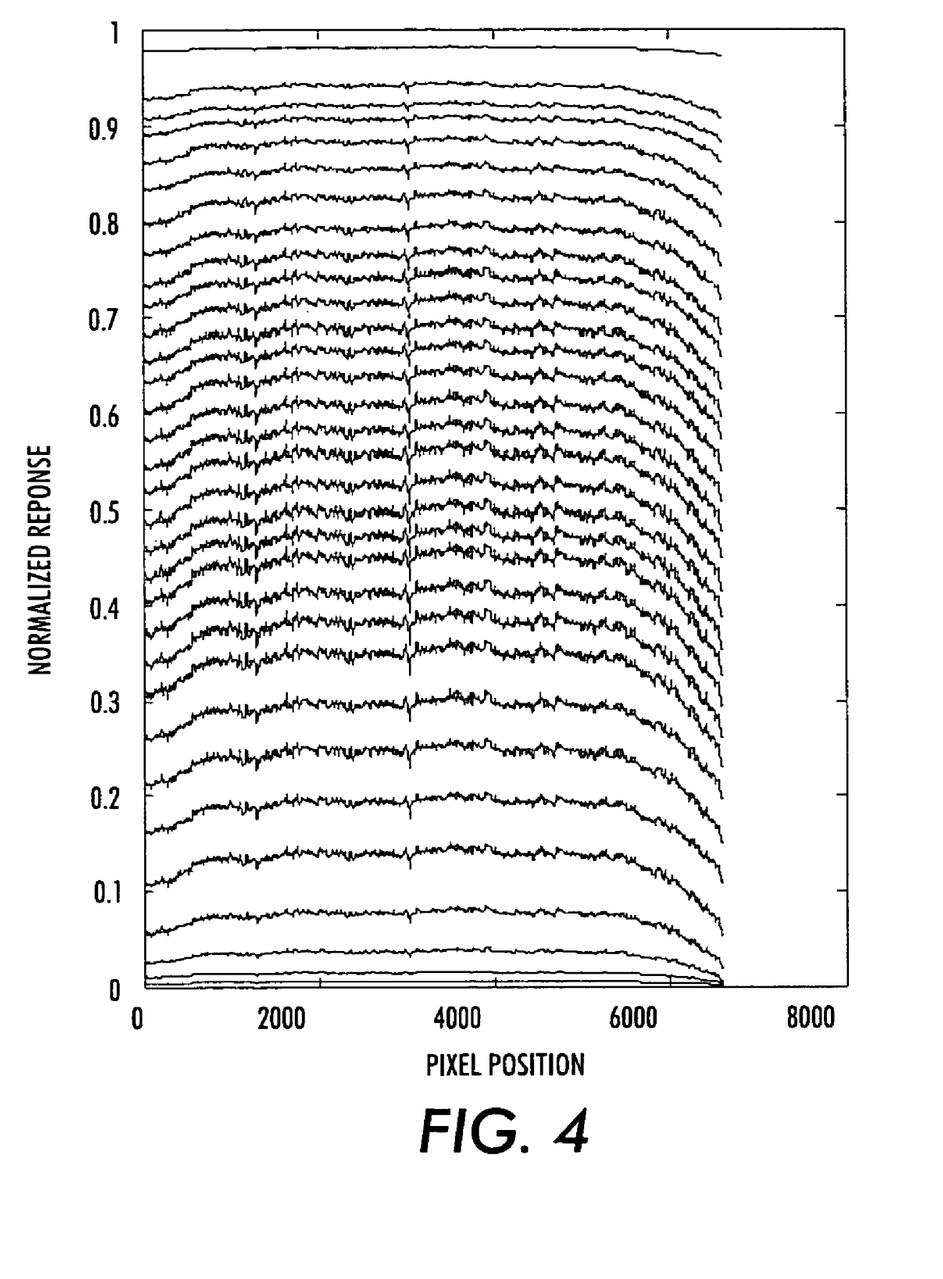
FIG. 4 is a graphical representation of 32 patches of FIG. 3 with correlated noise.

With reference to FIG. 4, the graph shows 32 profiles of FIG. 3. The correlation in the print densities among strips can be determined even if the significant noise is present. The uncorrelated noise between the strips is removed and the profile of each individual grayscale level is recovered. Thus, using the full characterization mode 80 along with the monitoring mode 90, structure in each ERC is reproduced. The relationship between levels is captured, despite the noise in the profiles of individual levels. Thus, the calibration strips which are used for the measurements described above can be quite narrow, which, therefore, allows processing of a large number of halftone strips. The full characterization step requires little toner usage as the patches can be made quite small.

With reference again to FIGS. 1 and 2, in the full characterization mode 80, input grayscale level values for various halftones are received 100 by the document processing system 10. An input gray level value is typically a digital value represented as an integer, for example, between 0 and 255. The input gray level is used to drive the print engine to produce a print density. The grayscale images, patches or strips, which include input grayscale values, can be received in various ways such as, for example, the input image data may include grayscale values associated with respective pixels positions in the image, the input data may be received via scanning process, and input data may be received through other appropriate data transfer techniques. A Tone Reproduction Curve or TRC module 110 determines modified grayscale values for respective input grayscale values in the received input grayscale image. For example, the modified grayscale pixel values for each halftone are determined by using respective pixel positions as an index into initial compensating TRC, to access a modification value for the respective pixel grayscale value and position. The initial compensating TRCs are determined in advance bygone of the methods known in the art such as described in Mestha, "Gray Balance Control Loop for Digital Color Printing Systems," and include a set of correcting or compensating rules for input grayscale pixel values. As a result of applying the compensating TRCs, some grayscale pixels values can be changed, while the other grayscale pixel values may be left unchanged. The compensated grayscale pixel values for each pixel are transmitted to the marking engine 14. The marking engine 14 writes toner or ink on the print media. The density of each halftone patch, e.g. a value of each individual ERC is measured or sensed by the sensor 20 in an interdocument zone of a photoreceptor belt or drum. For example, the patch density is measured by an optical sensor responding to light reflected from the patch or light transmitted through the patch. As another example, the print or patch density is measured by a full width array sensor, including a linear array of photosensitive detectors that responds to a light reflected from the photoreceptor surface or transmitted through the photoreceptor surface. For example, the sensor is s×r array, where s is a number of sensing elements in the process direction or direction parallel to the processing path of the print media, and r is a number of sensing elements in the cross process direction or direction perpendicular to the process direction. For example, the number of elements s in the process direction can be 1, while the number of sensing elements in the cross process direction can be equal to a number of cross process direction pixels of the given printer, such as, for example, 6600 pixels. Such sensor is a line sensor, or 1×r sensor. However, other arrangements of the sensing elements of the sensor are also contemplated.

For example, a collection of individual ERCs for an individual halftone is represented by a matrix:

$$\begin{pmatrix} d_{11} & d_{12} & \cdots & d_{1M} \\ d_{21} & d_{22} & & d_{2M} \\ \vdots & & \ddots & \\ d_{N1} & d_{N2} & & d_{NM} \end{pmatrix}, \quad \text{Matrix (1)}$$

where N is the index of grayscale level, e.g. 256 grayscale levels; and M is the index of the measurement in the cross process direction, e.g. 6600 positions.

In some printers, the sub systems may not produce a uniform response across the page. In such printers, the ERC may depend on cross process direction position thereby leading to streaks in the image. The spatial ERC, or s-ERC, is a set of ERCs that are referenced to each point in the cross process direction. To measure the variations in space, the patches are printed as a series of strips. Each patch or strip includes a predetermined grayscale level from 1 to N and a halftone screen from 1 to K, so that the entire set of patches or strips gives a substantially complete representation of dynamic range. To achieve effective feedback control for spatial uniformity, the s-ERC is characterized over the expected range of variation. In one embodiment, the full characterization is performed with the components that are currently in place in the control system, i.e., the sensor, and in the printing system, i.e., imaging element, to receive the most accurate results. For some printers, the initial non uniformity present in the printer may be sufficient to span the ERCs that may be encountered as the printer operates. A sufficient number of gray levels and halftone screens are required for the full characterization mode 80 to be printed and measured to accurately infer the print density by interpolating between the measured grayscale values. E.g., the more patches are used, the more accurate the interpolation is.

More specifically, for example, to represent the measurement of multiple halftones over space, the matrices representing varying ERC measurements across space for various halftones are appended to the matrix (1) as in the example below:

$$\begin{pmatrix} d_{111} & d_{112} & d_{113} & & d_{11M} \\ d_{121} & d_{122} & d_{123} & \cdots & d_{12M} \\ d_{131} & d_{132} & d_{133} & & d_{13M} \\ \vdots & & & \ddots & \\ d_{1N1} & d_{1N2} & d_{1N3} & & d_{1NM} \\ d_{211} & d_{212} & d_{213} & & d_{21M} \\ d_{221} & d_{222} & d_{223} & \cdots & d_{22M} \\ d_{231} & d_{232} & d_{233} & & d_{23M} \\ \vdots & & & \ddots & \\ d_{2N1} & d_{2N2} & d_{2N3} & & d_{2NM} \\ d_{K11} & d_{K12} & d_{K13} & & d_{K1M} \\ d_{K21} & d_{K22} & d_{K23} & \cdots & d_{K2M} \\ d_{K31} & d_{K32} & d_{K33} & & d_{K3SM} \\ \vdots & & & \ddots & \\ d_{KN1} & d_{KN2} & d_{KN3} & & d_{KNM} \end{pmatrix}, \quad \text{Matrix (2)}$$

where k is the index of the halftone;

M is the index of the measurement cross process position; and

N is the index of the grayscale level.

To measure variations in time, one or more setpoints are changed to change the print density of each sub system. E.g., the patches are reprinted to collect a series of ERCs at a number of different setpoints. For example, the number of setpoints is selected to sufficiently cover a span of setpoints the marking engine encounters during normal operation. To measure the variations in time, the patches are printed as a series of strips. Each patch or strip includes a predetermined gray level from 1 to N and a halftone from 1 to K, so that the entire set of patches or strips provides substantially complete representation of dynamic range. Each patch is measured with the sensor, which, in one embodiment, is the point sensor.

More specifically, for example, to represent the measurement of multiple halftones overtime, the matrices representing varying ERC measurements across time for various halftones are appended to the matrix (1) as in the example below:

$$\begin{pmatrix} d_{111} & d_{112} & d_{113} & & d_{11S} \\ d_{121} & d_{122} & d_{123} & \cdots & d_{12S} \\ d_{131} & d_{132} & d_{133} & & d_{13S} \\ \vdots & & & \ddots & \\ d_{1N1} & d_{1N2} & d_{1N3} & & d_{1NS} \\ d_{211} & d_{212} & d_{213} & & d_{21S} \\ d_{221} & d_{222} & d_{223} & \cdots & d_{22S} \\ d_{231} & d_{232} & d_{233} & & d_{23S} \\ \vdots & & & \ddots & \\ d_{2N1} & d_{2N2} & d_{2N3} & & d_{2NS} \\ d_{K11} & d_{K12} & d_{K13} & & d_{K1S} \\ d_{K21} & d_{K22} & d_{K23} & \cdots & d_{K2S} \\ d_{K31} & d_{K32} & d_{K33} & & d_{K3S} \\ \vdots & & & \ddots & \\ d_{KN1} & d_{KN2} & d_{KN3} & & d_{KNS} \end{pmatrix}, \quad \text{matrix (3)}$$

where k is the index of the halftone;

S is the index of the setpoint; and

N is the index of the grayscale level.

A mean ERC determining device 122 determines 124 mean or reference ERC $d_{ref}$ as an average of all individual measured ERCs $d_{meas}$ collected for each halftone and each gray level, for example, for all of pixel locations, e.g. 6600 pixel locations, and for all of setpoints. For example, the mean ERC can be presented as $[d_1\ d_2\ d_3\ \ldots\ d_N]^T$, where the d is the print density and the indices are the gray levels where the print density is measured.

A density variation determining device or algorithm or processor 128 determines 130 a variation matrix $\Delta d$, which represents the variation in density between reference or mean compensating ERCs $d_{ref}$ and the measured ERCs $d_{meas}$, by subtracting each reference ERC from a respective measured ERC:

$$[\Delta d] = [d_{meas}] - [d_{ref}] \quad \text{Equation (1)},$$

From equation (1) and assuming a small change from the reference ERC, a set of compensating TRCs $\Delta g$ can be derived as:

$$\Delta g = \Delta d / (\partial d_{ref} / \partial g),$$

where $\Delta g$ is the change that should be made in the TRC at gray level g, and $\partial d_{ref}/\partial g$ is the slope of the reference ERC. For larger variations from the reference TRCs more complex algorithms may be used to determine the change in the gray level needed to produce a stable SRC.

A transformation device 22 calculates significant basis vectors and weights 32 of the variation matrix Δd by applying a transform 134 to the data of the variation matrix Δd. For example, the transformation device 22 applies Singular Value Decomposition transform to the data of the variation matrix Δd to generate basis vectors and weights that are consistent with both describing the spatial variation and variation in time over multiple halftones:

$$[\Delta d] = [U][W] \qquad \text{Equation (3),}$$

where Δd represents the variation in density between the reference ERCs and the measured ERCs;

W represents weight vectors and is composed of scaled eigenvectors; and

U represents basis vectors or eigenvectors.

Of course, it is contemplated that the transformation device 22 can apply other transforms with basis vectors derived from experimental data using methods known in the art such as, for example, Principal Component Analysis. Also, the basis vectors can be any of the well known analytical functions such as Sines or Cosines, legendre polynomials, wavelets, etc.

In general, the number and length of the basis vectors can be equal to the number of measured patches or strips if proper transformation methods are used. The basis vectors can be orthogonal to one another, but orthogonality is not a constraint. The basis vectors are ordered from the vector that gives the highest percent variability of the individual ERC from the mean ERC to the lowest percent variability when Singular Value Decomposition methods are used to extract basis vectors from the experimental data.

Most of the ERC signal content, which has the most variation from the respective mean ERC, is stored in the first few components with the higher order components being dominated by noise. For example, to reduce noise and facilitate computational efficiency, vectors or the components with the greater signal contribution, are selected, while the higher order components that are dominated by noise are eliminated. For example, one, two, three, or four first principal components are selected and the higher order components are discarded. Of course, it is contemplated that a different number of components may be used. The selected components or basis vectors are stored 140 in a basis vector memory 142. The weights for each selected component are selected such that the selected components together with determined weights define the variation from the reference ERC for each respective measured ERC. The determined weights for each selected component are stored 144 in a weights memory 146.

The TRC set determining device 24 determines 150 a set of compensating TRCs or desired TRCs $g_{desired}$. The compensating TRCs are stored 160 in the TRC module 110.

The basis vectors are the means to correlate the ERCs of the various halftones. The weights together with the basis vectors characterize the ERC at different positions in the cross process direction. As the printer runs, the new streaks may appear at the ERC that change as a function of position. Such changes in the ERC are detected in the monitoring mode 90. In the monitoring mode 90, the uniformity of a subset of the gray levels is monitored. In one embodiment, if three basis vectors are used by the transform 134 in the full characterization mode 80 to transform the ERC, then the uniformity of three gray levels is measured in the monitoring mode 90, although in general more gray levels can be monitored. From the newly determined profiles and the basis vectors determined in the full characterization mode 80, an updated set of weights which describe the current operating condition of the machine is determined 170. The newly determined weights are applied to the basis vectors determined in the full characterization mode 80 to update 172 the TRC for each of the halftones. Hence, the correlation means allows a reduced number of patches using one or more halftones or reference patterns, and generating TRCs for all halftones represented by the basis vector. Such correlation method can be employed in various imaging-based control applications.

In the example below, first and second basis vectors $u_1$, $u_2$ are selected to represent together with the corresponding weights the variation in density of the measured ERCs from the mean ERCs for k different halftones. The first basis vector $u_1$ is the basis vector which represents the largest variation from the mean ERC. The second basis vector $u_2$ is the basis vector that represents the second largest variation from the mean ERC. In the full characterization step 80, the TRC set determining device 24 determines 150 a set of compensating TRCs or desired TRCs $g_{desired}$. The desired TRC produces an intended gray level in response to received input gray level.

$$[g_{desired}] = f([d_{ref}] + [u_1][w_1] + [u_2][w_2])$$

or in a matrix format:

$$\begin{bmatrix} y_{11j} \\ y_{12j} \\ y_{13j} \\ \vdots \\ y_{1Nj} \\ \hline y_{21j} \\ y_{22j} \\ y_{23j} \\ \vdots \\ y_{2Nj} \\ \cdots \\ \hline y_{k1j} \\ y_{k2j} \\ y_{k3j} \\ \vdots \\ y_{kNj} \end{bmatrix} = f\left( \begin{bmatrix} ref_{110} \\ ref_{120} \\ ref_{130} \\ \vdots \\ ref_{1N0} \\ \hline ref_{210} \\ ref_{220} \\ ref_{230} \\ \vdots \\ ref_{2N0} \\ \cdots \\ \hline ref_{k10} \\ ref_{k20} \\ ref_{k30} \\ \vdots \\ ref_{kN0} \end{bmatrix} + w_1(j) \begin{bmatrix} u_{111} \\ u_{121} \\ u_{131} \\ \vdots \\ u_{1N1} \\ \hline u_{211} \\ u_{221} \\ u_{231} \\ \vdots \\ u_{2N1} \\ \cdots \\ \hline u_{k11} \\ u_{k21} \\ u_{k31} \\ \vdots \\ u_{kN1} \end{bmatrix} + w_2(j) \begin{bmatrix} u_{112} \\ u_{122} \\ u_{132} \\ \vdots \\ u_{1N2} \\ \hline u_{212} \\ u_{222} \\ u_{232} \\ \vdots \\ u_{2N2} \\ \cdots \\ \hline u_{k12} \\ u_{k22} \\ u_{k32} \\ \vdots \\ u_{kN2} \end{bmatrix} \right)$$

where g is the desired TRC;

f( ) is a function that produces compensating TRCs;

$d_{ref}$ is the mean ERC over the cross process position for each halftone;

$u_1$ is the first basis vector;

$u_2$ is the second basis vector;

$w_1(j)$ is the first set of weights as a function of cross process position corresponding to the first basis vector;

$w_2(j)$ is the second set of weights as a function of cross process position corresponding to the second basis vector;

k is the index of halftone;

j is the pixel position; and

N is the index of grayscale level for each halftone.

As explained above, in the monitoring mode 90 the uniformity of two gray levels is measured and monitored. The weights, previously determined in the full characterization mode 80 are updated 170. The previously determined compensating TRCs are updated 172 with the updated weights.

In the manner described above, the multiple ERC matrix allows efficient correlation of the density response of the various halftones at the same time. In some printing and control scenarios it may be beneficial to use a pattern other than a conventional printer halftone, such as a line pattern. The print density of that pattern can be appended to the matrix similar to the appending of print density for the halftones. The number of gray levels does not necessarily have to be the same for each halftone. The print densities for the different halftones in a single column must be correlated. For example, the print densities for the different halftones are measured at the same sub system setpoints for the time-dependent measurement, or are extracted for uniformity strips measured at the same time for the spatial measurement.

Although described with reference to multiple halftones, the methods and apparatuses described above are applicable to any sub systems of the document processing system that change the engine response curve to the input gray level such as media type, environmental zones, and other like sub systems disturbances.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   (a) receiving multiple input patches on an output media which are characterized by print density representing a document processing system's response to different input grayscale values over a potential response space;
   (b) measuring values associated with the print density of each input grayscale value using a sensor;
   (c) determining reference Engine Response Curves from the measured print density values and input grayscale values;
   (d) determining a variance data representative of a difference between each measured print density value and a respective reference Engine Response Curve;
   (e) transforming the variance data into individual components using a transformation processor, wherein each individual component including a data content and a noise content;
   (f) based at least on one selected individual component, determining a set of calibration compensating Tone Reproduction Curves; and
   (g) applying the determined calibration compensating Tone Reproduction Curves to input grayscale values.

2. The method of claim 1, wherein the input patches include multiple halftones.

3. The method of claim 1, wherein the output media includes different print media.

4. The method of claim 3, wherein the output media includes at least one of:
   photoreceptor belt,
   drum, and
   paper.

5. The method of claim 1, wherein the steps (a) through (g) are performed for substantially entire range of grayscale values and the potential response space.

6. The method of claim 1, wherein the step (f) further includes:
   determining weights for the selected individual components.

7. The method of claim 6, further including:
   periodically, receiving selected input patches which represent selected grayscale values over the potential response space;
   measuring Engine Response Curves for each set of input patches, which each Engine Response Curve is associated with a print density value of the patch printed with a respective document processing system setpoint;
   determining a variance data representative of a difference between each measured Engine Response Curve and the respective reference Engine Response Curve;
   based on the measured Engine Response Curves and selected components, determining a set of updated weights;
   updating the set of calibration compensating Tone Reproduction Curves with the updated weights; and
   applying the updated compensating Tone Reproduction Curves to input grayscale values.

8. The method of claim 6, further including:
   periodically, receiving selected input patches which represent selected grayscale values over the potential response space;
   measuring Engine Response Curves for each set of input patches, which each Engine Response Curve is associated with a print density of the patch at a particular position in the cross process direction;
   determining a variance data representative of a difference between each measured Engine Response Curve and the respective reference Engine Response Curve;
   based on the measured Engine Response Curves and selected components, determining a set of updated weights;
   updating the set of calibration compensating Tone Reproduction Curves with the updated weights; and
   applying the updated compensating Tone Reproduction Curves to input grayscale values.

9. The method of claim 1, wherein a transform applied in the transforming step includes at least one of:
   Singular Value Decomposition,
   Principal Component Analysis,
   Sine transformation,
   Cosine transformation,
   Legendre Polynomial transformation, and
   Wavelet transformation.

10. The method of claim 1, wherein the step (f) includes:
    selecting one or more individual components based on a signal to noise ratio.

11. The method of claim 1, wherein the printing device includes a xerographic imaging device.

12. A document processing system comprising:
    a marking engine for printing input patches on an output media corresponding to input digital grayscale values;
    a sensor for measuring print density of the input patches associated with respective input grayscale values;
    a mean ERG determining device for determining reference Engine Response Curves from a series of measured print density values for a set of different input grayscale values;
    a compensating device for determining a set of compensating Tone Reproduction Curves and applying the determined compensating Tone Reproduction Curves to the input grayscale values to maintain a space of desired uniformity over at least one of space and time, which compensating device includes:
- a density variation determining device for determining a variance data representative of a difference between each measured print density value and a respective reference Engine Response Curve, and
- a transformation device for transforming the variance data into individual components, based on which the compensating device determines a set of compensating Tone Reproduction Curves.

13. The system of claim 12, wherein the document processing system is characterized by a plurality of individual Engine Response Curves.

14. The system of claim 12, wherein the input patches include multiple halftones.

15. The system of claim 12, wherein the output media includes at least one of:
- photoreceptor belt;
- drum; and
- paper.

16. The system of claim 12, wherein the marking engine one of:
- prints input patches for substantially entire range of the grayscale values and the space of desired uniformity for a full characterization of print density uniformity of the document processing system; and
- prints input patches of selected grayscale values for at least a portion of the space of desired uniformity for monitoring and maintaining print density uniformity of the document processing system.

17. The system of claim 12, wherein the transformation device performs at least one of:
- Singular Value Decomposition transform,
- Principal Component Analysis,
- Sine transformation,
- Cosine transformation,
- Legendre Polynomial transformation, and
- Wavelet transformation.

18. The system of claim 12, wherein the marking engine includes a xerographic imaging device.

19. A method of transforming multiple patches into improved input grayscale values, comprising:
   (a) receiving multiple input patches on an output media which are characterized by print density representing a document processing system's response to different input grayscale values over a potential response space;
   (b) measuring values associated with the print density of each input grayscale value using a sensor;
   (c) determining reference Engine Response Curves from the measured print density values and input grayscale values;
   (d) determining a variance data representative of a difference between each measured print density value and a respective reference Engine Response Curve;
   (e) transforming the variance data into individual components using a transformation processor, wherein each individual component including a data content and a noise content;
   (f) based at least on one selected individual component, determining a set of calibration compensating Tone Reproduction Curves; and
   (g) applying the determined calibration compensating Tone Reproduction Curves to input grayscale values.

20. The method of claim 19, wherein the step (f) further includes:
- determining weights for the selected individual components;
- periodically, receiving selected input patches which represent selected grayscale values over the potential response space;
- measuring Engine Response Curves for each set of input patches, which each Engine Response Curve is associated with a print density value of the patch printed with a respective document processing system setpoint;
- determining a variance data representative of a difference between each measured Engine Response Curve and the respective reference Engine Response Curve;
- based on the measured Engine Response Curves and selected components, determining a set of updated weights;
- updating the set of calibration compensating Tone Reproduction Curves with the updated weights;
- applying the updated compensating Tone Reproduction Curves to input grayscale values;
- periodically, receiving selected input patches which represent selected grayscale values over the potential response space;
- measuring Engine Response Curves for each set of input patches, which each Engine Response Curve is associated with a print density of the patch at a particular position in the cross process direction;
- determining a variance data representative of a difference between each measured Engine Response Curve and the respective reference Engine Response Curve;
- based on the measured Engine Response Curves and selected components, determining a set of updated weights;
- updating the set of calibration compensating Tone Reproduction Curves with the updated weights; and
- applying the updated compensating Tone Reproduction Curves to input grayscale values.

* * * * *